United States Patent
Hansen

(10) Patent No.: US 12,538,875 B2
(45) Date of Patent: Feb. 3, 2026

(54) SYSTEM FOR PACKAGING GROWTH MEDIUM POTS INTO PROPAGATION TRAYS, AND DISTRIBUTOR APPARATUSES THEREFOR

(71) Applicant: Ellepot A/S, Esbjerg N (DK)

(72) Inventor: Lars Peter Bilde Hansen, Vejen (DK)

(73) Assignee: Ellepot A/S, Esbjerg N (DK)

( * ) Notice: Subject to any disclaimer, the term of this patent is extended or adjusted under 35 U.S.C. 154(b) by 122 days.

(21) Appl. No.: 18/035,244

(22) PCT Filed: Oct. 15, 2021

(86) PCT No.: PCT/EP2021/078584
§ 371 (c)(1),
(2) Date: May 3, 2023

(87) PCT Pub. No.: WO2022/096251
PCT Pub. Date: May 12, 2022

(65) Prior Publication Data
US 2023/0403990 A1 Dec. 21, 2023

(30) Foreign Application Priority Data
Nov. 6, 2020 (DK) ................................ 202001255

(51) Int. Cl.
*A01G 9/08* (2006.01)
*A01G 9/029* (2018.01)
(Continued)

(52) U.S. Cl.
CPC ........... *A01G 9/088* (2013.01); *A01G 9/0299* (2018.02); *A01G 9/081* (2013.01); *A01G 24/44* (2018.02); *A01G 24/60* (2018.02)

(58) Field of Classification Search
CPC ...... A01G 9/088; A01G 9/0299; A01G 24/44; A01G 24/60; A01G 9/081; B65B 37/005;
(Continued)

(56) References Cited

U.S. PATENT DOCUMENTS

| | | | |
|---|---|---|---|
| 4,408,549 A | 10/1983 | Qvarnstrom | |
| 5,881,655 A * | 3/1999 | Edmonds | A01G 9/083 |
| | | | 111/105 |

(Continued)

FOREIGN PATENT DOCUMENTS

| | | |
|---|---|---|
| BE | 1009390 A6 | 3/1997 |
| CN | 105460626 A | 4/2016 |

(Continued)

OTHER PUBLICATIONS

International Search Report from International Application No. PCT/EP2021/078584; date mailed: Jan. 18, 2022.

*Primary Examiner* — Veronica Martin
(74) *Attorney, Agent, or Firm* — Morse, Barnes-Brown & Pendleton, P.C.; Sean D. Detweiler, Esq.

(57) ABSTRACT

A system for packaging growth medium pots onto propagation trays is provided. The system includes an apparatus adapted for producing a length of growth medium cut into growth medium pots of suitable size; and a distributor apparatus adapted for positioning growth medium pots into a propagation tray or the like. The distributor apparatus comprises a) a first apparatus, b) a conveyor unit, and c) a second apparatus. The first apparatus is configured for positioning growth medium pots onto said conveyor unit. The conveyor unit comprises an endless conveyor belt adapted for transporting the growth medium pots toward the second apparatus. The second apparatus is configured for moving said growth medium pots positioned on the said conveyor belt into a propagation tray or the like.

16 Claims, 7 Drawing Sheets

(51) Int. Cl.
*A01G 24/44* (2018.01)
*A01G 24/60* (2018.01)

(58) Field of Classification Search
CPC ... B65B 41/16; B65B 51/30; B65B 9/04; B65B 9/20; B65B 9/2014; B65B 9/2056; B65B 9/213
See application file for complete search history.

(56) References Cited

U.S. PATENT DOCUMENTS

| | | |
|---|---|---|
| 2003/0097786 A1 | 5/2003 | Van Horssen et al. |
| 2010/0006607 A1* | 1/2010 | Morse ............... A01G 9/081 222/544 |
| 2019/0216024 A1* | 7/2019 | Tranberg ............ A01G 9/0299 |
| 2022/0217899 A1* | 7/2022 | Hasoon ............. A01G 9/088 |

FOREIGN PATENT DOCUMENTS

| | | |
|---|---|---|
| DE | 29514809 U1 | 11/1995 |
| EP | 0672343 A1 | 9/1995 |
| KR | 20090001467 U | 2/2009 |
| NL | 1016554 C2 | 5/2002 |
| NL | 1031081 C2 | 8/2007 |
| WO | 92/03914 A1 | 3/1992 |
| WO | 2005/084417 A1 | 9/2005 |
| WO | 2008013933 A2 | 1/2008 |
| WO | 2017/216145 A1 | 12/2017 |
| WO | 2017216146 A1 | 12/2017 |

* cited by examiner

SYSTEM FOR PACKAGING GROWTH MEDIUM POTS INTO PROPAGATION TRAYS, AND DISTRIBUTOR APPARATUSES THEREFOR

RELATED APPLICATIONS

This application is a national stage filing under 37 U.S.C. 371 of International Application No. PCT/EP2021/078584, filed Oct. 15, 2021, which claims priority to Denmark Application No. PA 2020 01255, filed Nov. 6, 2020. The entire teachings of said applications are incorporated herein by reference herein. International Application PCT/EP2021/078584 was published under PCT Article 21(2) in English.

TECHNICAL FIELD OF THE INVENTION

The present invention relates to the production of growth medium pots. More particularly, the present invention relates to a system for positioning a length of growth medium cut into pieces of suitable size into a propagation tray or the like.

BACKGROUND OF THE INVENTION

For the propagation of plants, starting either from seeds or from cuttings, it is well-known in the art to use small pots. The pots are traditionally made in a continuous process as disclosed in WO9203914 to obtain a cheap product that is relatively easy to handle. When the continuous blocks of growth medium are cut into pots/pieces of suitable size, each individual piece of the continuous block of growth medium is manually or automatically positioned into a propagation tray. One of the main problems for gardeners who cultivate in standard plastic and ceramic plant pots is root structure. This is due to the roots of plants placed in traditional pots can become easily stifled, which may result in killing the plant. The above-mentioned paper pots are much better to use as air can penetrate through their walls, which dries up (air pruning) the roots and forces the plant to sprout new fresh ones. For this process to work in a propagation tray or the like, it is important that the pot is smaller in diameter than the cavity in the propagation tray or the like. However, at present, a lot of loose growth medium from the pots fall into the void between the pot and the wall of the cavity in the propagation tray or the like during the positioning step, thereby reducing the effect of air pruning, reduces the ventilation around the pot, and increases the risk of algae growth.

NL 1016554 C2 discloses a system for plant pots. The system comprises a receiving device for plant pots, a displacement device connected to the receiving device and configured for moving rows of pots, a distributor device adapted for spacing the pots apart by a given distance, and an ejector device for placing the spaced apart pots on a work floor.

DESCRIPTION OF THE INVENTION

It is an object of the present invention to secure an optimal growth of the plant roots in a pot positioned in a propagation tray or the like. This is obtained by providing a system for packaging growth medium pots into propagation trays with a distributor apparatus that reduces the amount of loose growth medium that falls into the void between a pot and the wall of a cavity in a propagation tray or the like.

Hence, a first aspect relates to a system for packaging growth medium pots onto propagation trays or the like comprising:
  an apparatus adapted for producing a length of growth medium cut into growth medium pots of suitable size; and
  a distributor apparatus adapted for positioning growth medium pots into a propagation tray or the like.

The distributor apparatus preferably comprises:
  a first apparatus;
  a conveyor unit; and
  a second apparatus;
wherein said first apparatus is configured for positioning growth medium pots onto said conveyor unit;
wherein said conveyor unit comprises an endless conveyor belt adapted for transporting said growth medium pots towards said second apparatus;
wherein said second apparatus is configured for moving said growth medium pots positioned on said conveyor belt into a propagation tray or the like.

The propagation tray or the like is in this context meant to include, e.g., gutters for hydroponic plant production, such as a into a plurality of juxtaposed gutters for hydroponic plant production.

When transporting a length of growth medium cut into pieces of suitable size into the distributor apparatus according to the present invention, the individual pieces are capable of supporting each other until the step where they need to be positioned onto the endless conveyor belt. Here, each pot preferably needs to be supportably positioned thereon to avoid that they tilt. In one or more embodiments, the growth medium pots are tubular and open-ended. The pots are preferably positioned on one of its ends but could be positioned on its side. During the positioning operation, a part of the growth medium spills onto the endless conveyor belt. The conveyor belt has a dual function. Obviously, it is adapted for transporting the growth medium pots towards the second apparatus, but it also has the function of transporting the spilled growth medium towards its end, where it preferably falls into a tank or the like for reuse in the production of new growth medium pots. Thereby, the loose growth medium is not transported into the second apparatus and into the propagation tray or the like.

The term "length of growth medium" refers to the production of growth medium, which is made in a continuous line as e.g., disclosed in WO9203914. The length of growth medium is thereafter cut into pieces of suitable size (height relative to the diameter), corresponding to the desired size of a propagation pot. Hence, a synonymous term to the term "length of growth medium" may be a "continuous block of growth medium".

In one or more embodiments, the first apparatus is configured for positioning a single growth medium pot onto said conveyor unit at the time. The distributor apparatus may comprise a plurality of first apparatuses, each configured for positioning a single growth medium pot onto said conveyor unit at the time. The first apparatuses are preferably configured for positioning their pots at different locations on the endless conveyor belt, e.g., such that their lines of pots are offset from each other.

In one or more embodiments, the positioning step is performed such that the growth medium pot is positioned onto the conveyor belt/unit such that is rests on one of its ends.

In one or more embodiments, the first apparatus comprises a guide support adapted for supporting the growth medium pot until it reaches the endless conveyor belt.

In one or more embodiments, the first apparatus comprises a guide support adapted for supporting the growth medium pot until it reaches the endless conveyor belt, wherein said guide support is configured to allow loose growth medium to pass therethrough, thereby preventing said loose growth medium from reaching said endless conveyor belt. Preferably, the guide support is configured as a grate, or as a plate with holes or cut-outs, or as multiple rods with a predetermined distance there between.

In one or more embodiments, the first apparatus comprises a feeding tube adapted for connection to a production apparatus adapted for producing a length of growth medium cut into pieces of suitable size, wherein said feeding tube is adapted for receiving a length of growth medium cut into pieces of suitable size from said production apparatus and to deliver a single growth medium pot onto said guide support. The feeding tube may e.g., be configured as a tube with an approximately turn. This configuration allows the feeding tube to turn the pots from a horizontal position to a vertical position, or vice versa. The outlet of the tube may be positioned above the guide support such that only a single pot may leave the tube at the time. Preferably, the first apparatus comprises a plunger or piston unit and a feed guide, wherein said plunger or piston unit is adapted for feeding a growth medium pot onto said conveyor belt, and wherein said feed guide is adapted for receiving and supporting said growth medium pot as it is fed from said plunger or piston unit, thereby securing the correct position of supporting said growth medium pot on said conveyor belt. The feed guide may be adapted for being in an extended position and a retracted position relative to said plunger or piston unit. In this configuration, the feed guide supports the pot along at least a part of its movement from below the tube outlet to the conveyor belt.

The second apparatus may have many different configurations for moving the growth medium pots from the conveyor belt and into a propagation tray. It may e.g., be configured with a plunger or piston unit that moves across the conveyor belt and pushes one or more growth medium pots positioned on said conveyor belt via a guide and into one or more cavities in the propagation tray or the like. Alternatively, the second apparatus comprises a sweeping unit adapted for pushing/sweeping one or more growth medium pots positioned on said conveyor belt via a guide and into one or more cavities in the propagation tray or the like.

In one or more embodiments, the second apparatus comprises sweeping unit adapted for removing one or more of said growth medium pots positioned on said conveyor belt and into said second apparatus. The sweeping unit may be configured with one or more feed guides. The feed guides may each be configured as an approximately semi-circular, or semi-tubular, or concave cavity adapted for guiding and supporting a tubular growth medium pot. In one or more embodiments, the second apparatus comprises a guide block with one or more cavities, each adapted for receiving and positioning a growth medium pot fed by the plunger or piston unit or sweeping unit. The cavity may be approximately semi-circular, or semi-tubular, or concave and adapted for positioning and supporting a tubular growth medium pot. The guide block is adapted for guiding a growth medium pot into a cavity in a propagation tray. In a specific configuration the guide block comprises one or more channels, each adapted for receiving a growth medium pot and for guiding said pot towards a cavity in a propagation tray. In order to force the pot through the channel, the second apparatus may comprise a plunger or piston unit adapted for being in a first retracted position outside said channel and in a second extended/forwarded position within said channel. To time and correctly position the pot at the entrance of said channel, the guide block may comprise a guide support adapted for being in an extended position in front of and/or above the entrance of said channel and in a retracted position cleared from said entrance. Obviously, a controller unit is configured to time the operation of the sweeping/plunger or piston unit, optionally a plunger or piston unit adapted for forcing the pot through the channel, and the guide support in order to secure the pot in a cavity of a propagation tray or the like.

In one or more embodiments, the guide block comprises 2-50 channels, such as within the range of 3-45, e.g., within the range of 4-40, such as within the range of 5-35, e.g., within the range of 6-30, such as within the range of 7-25, e.g., within the range of 8-20, such as within the range of 9-15, e.g., within the range of 10-15 channels.

In one or more embodiments, the channel comprises holding means adapted for releasably holding a growth medium pot when positioned therein. This configuration secures that the growth medium pot leaves the channel at the right time. This configuration may be combined with the plunger or piston unit as described above.

It should be noted that embodiments and features described in the context of one of the aspects of the present invention also apply to the other aspects of the invention.

DETAILED DESCRIPTION OF THE INVENTION

Figure 1:
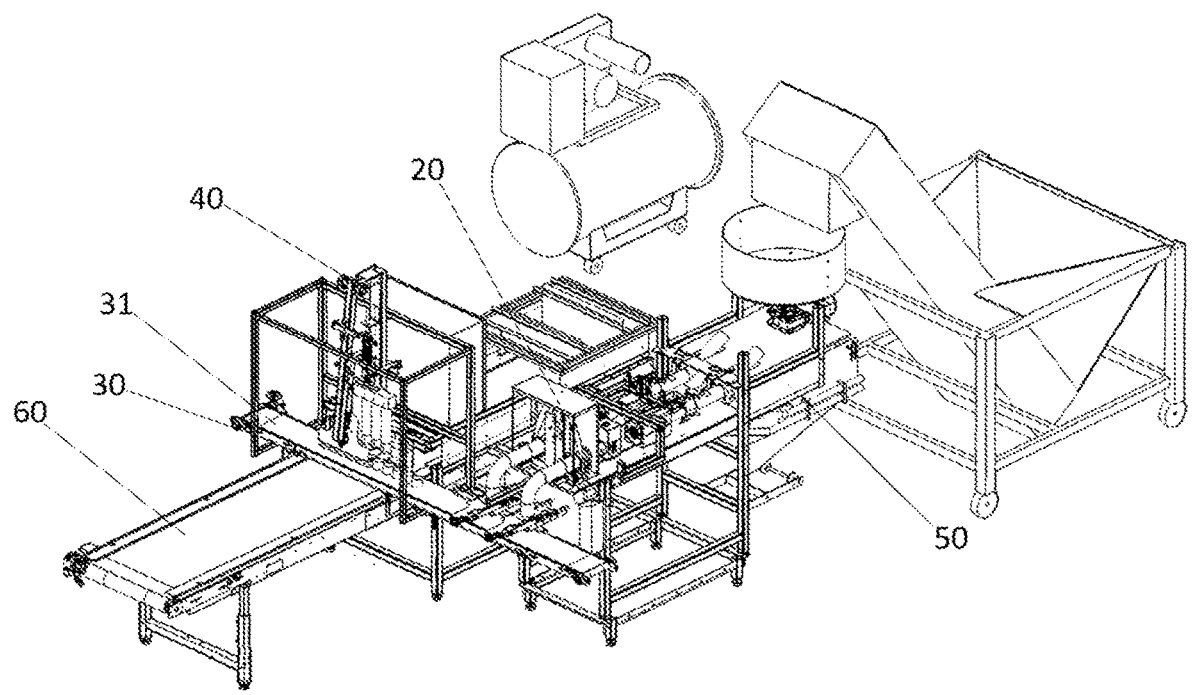
FIG. 1 shows a system for packaging growth medium pots into propagation trays in accordance with various embodiments of the invention.

FIG. 1 shows a system for packaging growth medium pots into propagation trays in accordance with various embodiments of the invention. The system comprises an apparatus 50 adapted for producing a length of growth medium cut into growth medium pots, and a distributor apparatus. The distributor apparatus comprises a first apparatus 20, a conveyor unit 30, and a second apparatus 40.

The first apparatus 20 is configured for positioning growth medium pots onto the conveyor unit 30. The conveyor unit 30 comprises an endless conveyor belt 31 adapted for transporting said growth medium pots (not shown) towards the second apparatus 40. The second apparatus 40 is configured for moving the growth medium pots (not shown) positioned on the conveyor belt 31 into a propagation tray (not shown). The propagation tray is delivered via conveyor unit 60.

Figure 2:
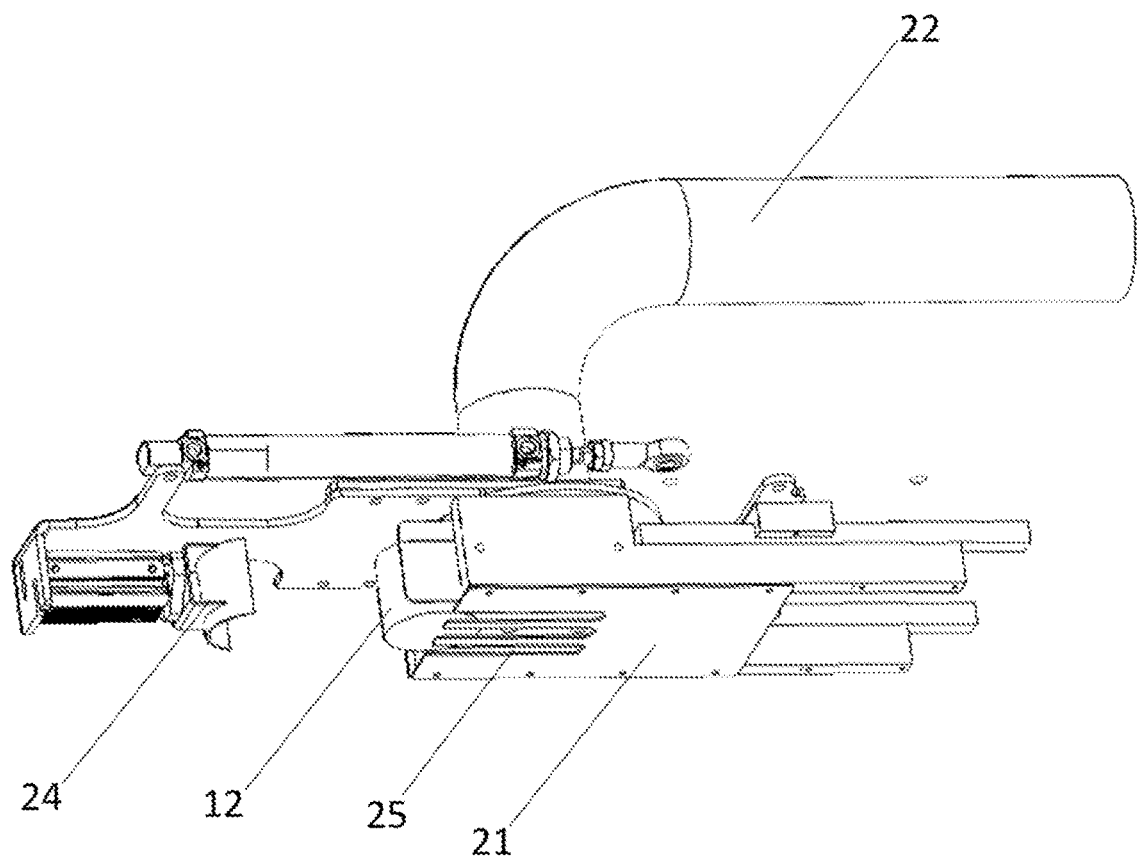
FIGS. 2 and 4 show parts of a first apparatus in accordance with various embodiments of the invention.
Figure 4:
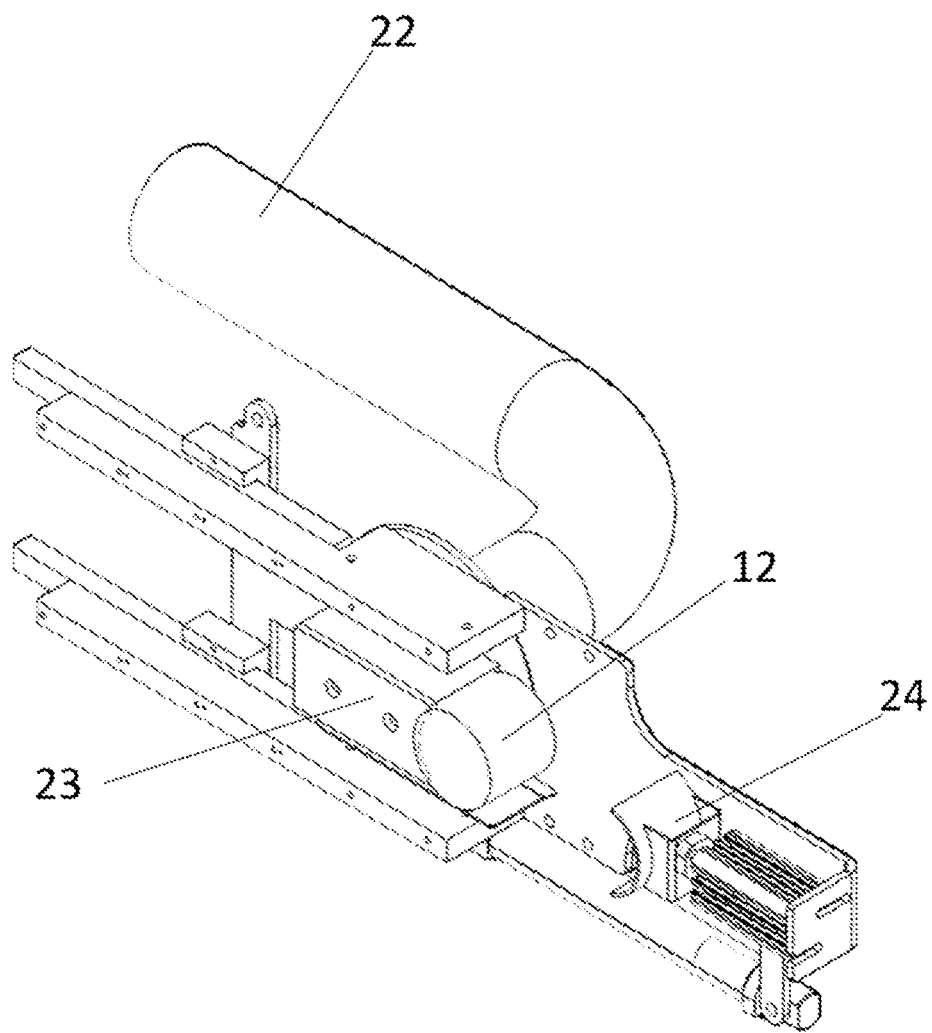

FIGS. 2 and 4 show the first apparatus 20 in accordance with various embodiments of the present invention. The first apparatus 20 comprises a feeding tube 22 adapted for connection to the production apparatus 50 (FIG. 1) adapted for producing a length of growth medium cut into pieces of suitable size. The feeding tube 22 is adapted for receiving a length of growth medium cut into pieces of suitable size from the production apparatus 50. The first apparatus 20 also comprises a plunger or piston unit 23, a feed guide 24, and a guide support 21. The plunger or piston unit 23 is adapted to push the growth medium pot 12 onto the conveyor unit 30 (FIG. 1), while said pot 12 being supported by the feed guide 24, and the guide support 21. Hence, the feed guide 24 is adapted for receiving and supporting the growth medium pot 12 as it is fed from the plunger or piston unit 23, thereby securing the correct position of growth medium pot 12 on the conveyor belt 31. The guide support 21 is designed with slits or holes 25 so that the excess or loose growth medium can be removed from the growth medium pot 12 prior to being placed on the conveyor belt 31. In FIG. 4, the guide support is removed to better show the plunger or piston unit 23.

Figure 3:
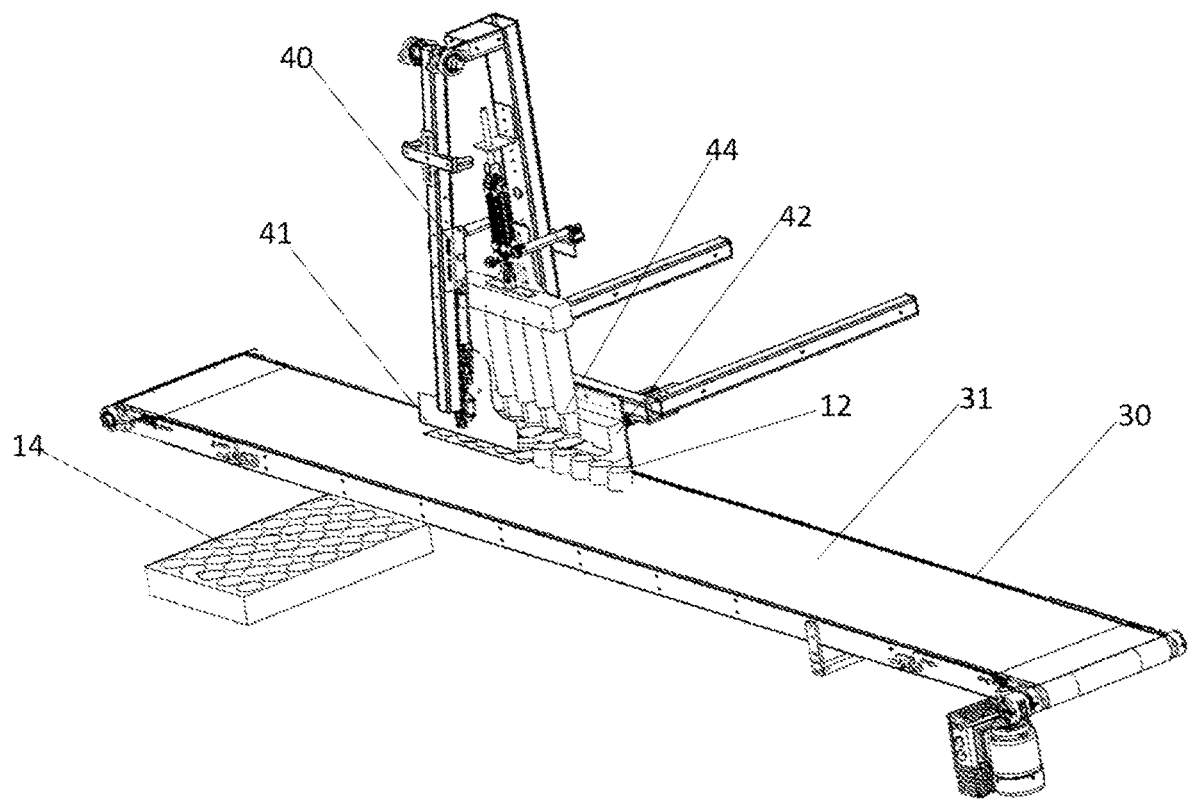
FIGS. 3, 5, and 6 show parts of a second apparatus in accordance with various embodiments of the invention.
Figure 5:
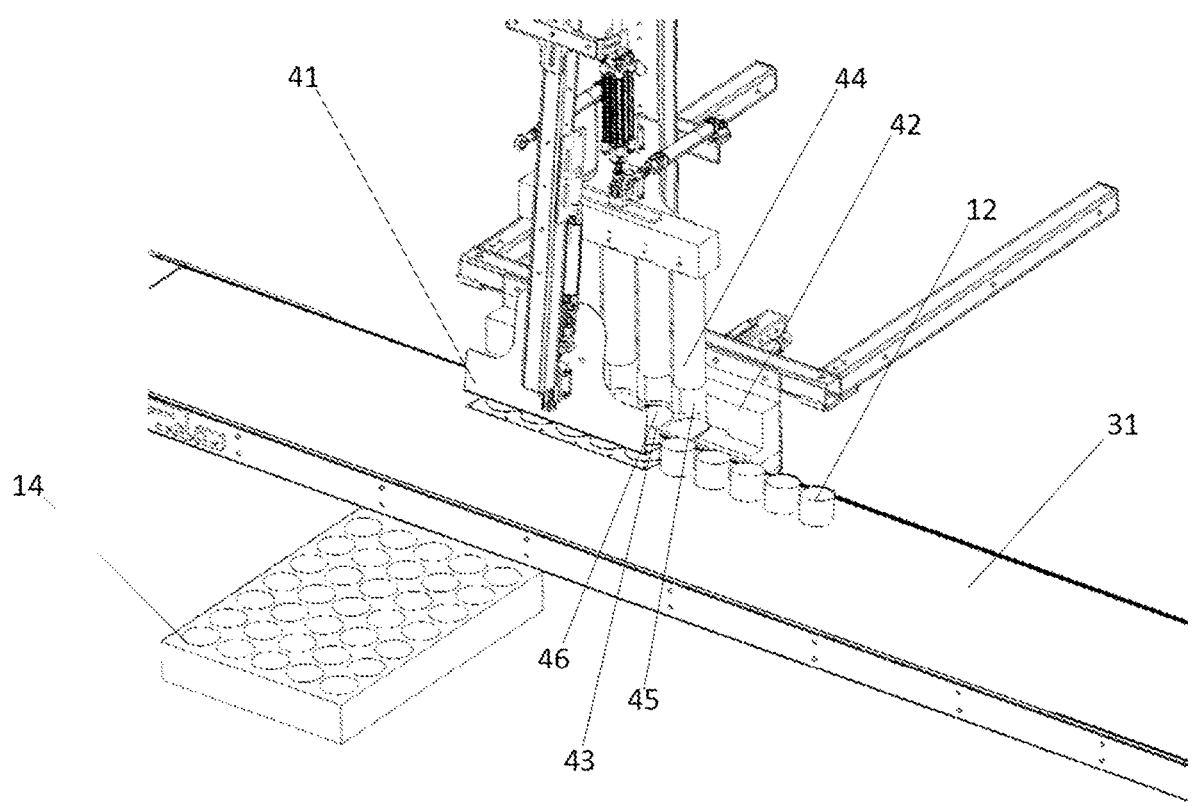
Figure 6:
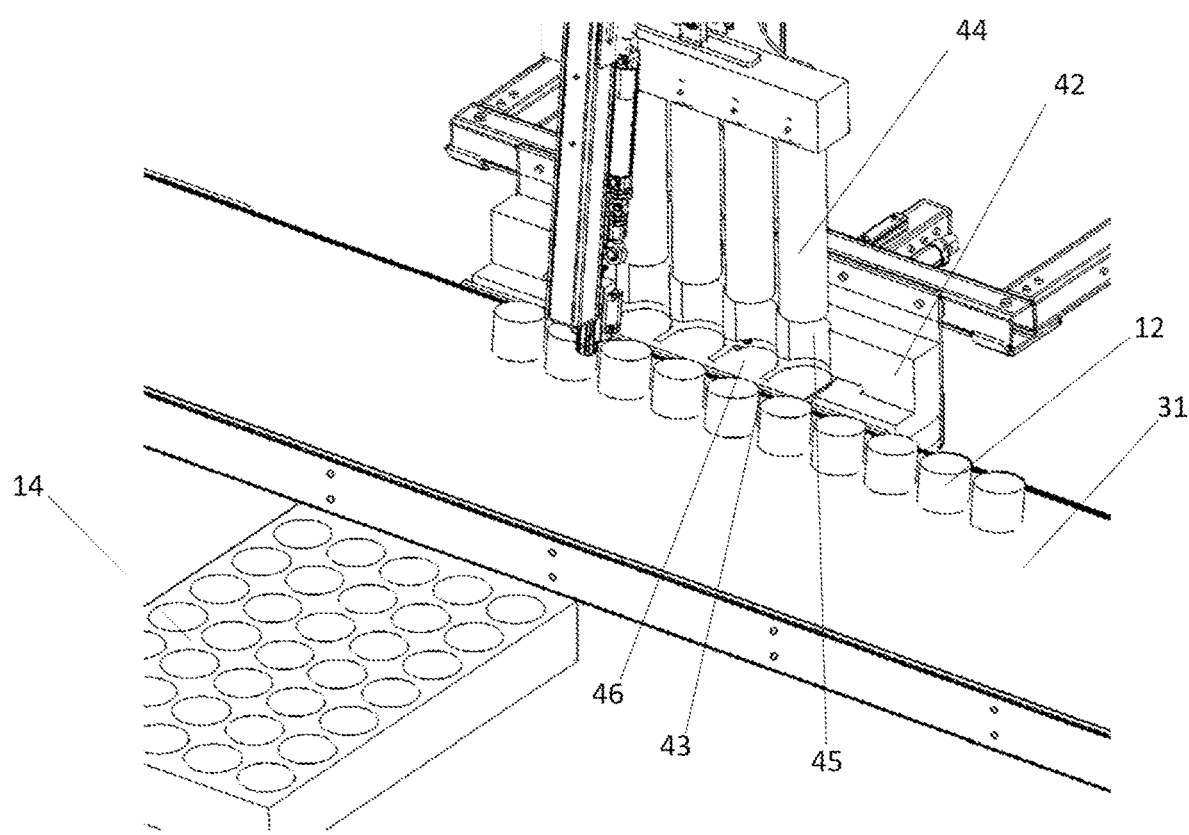
Figure 7:
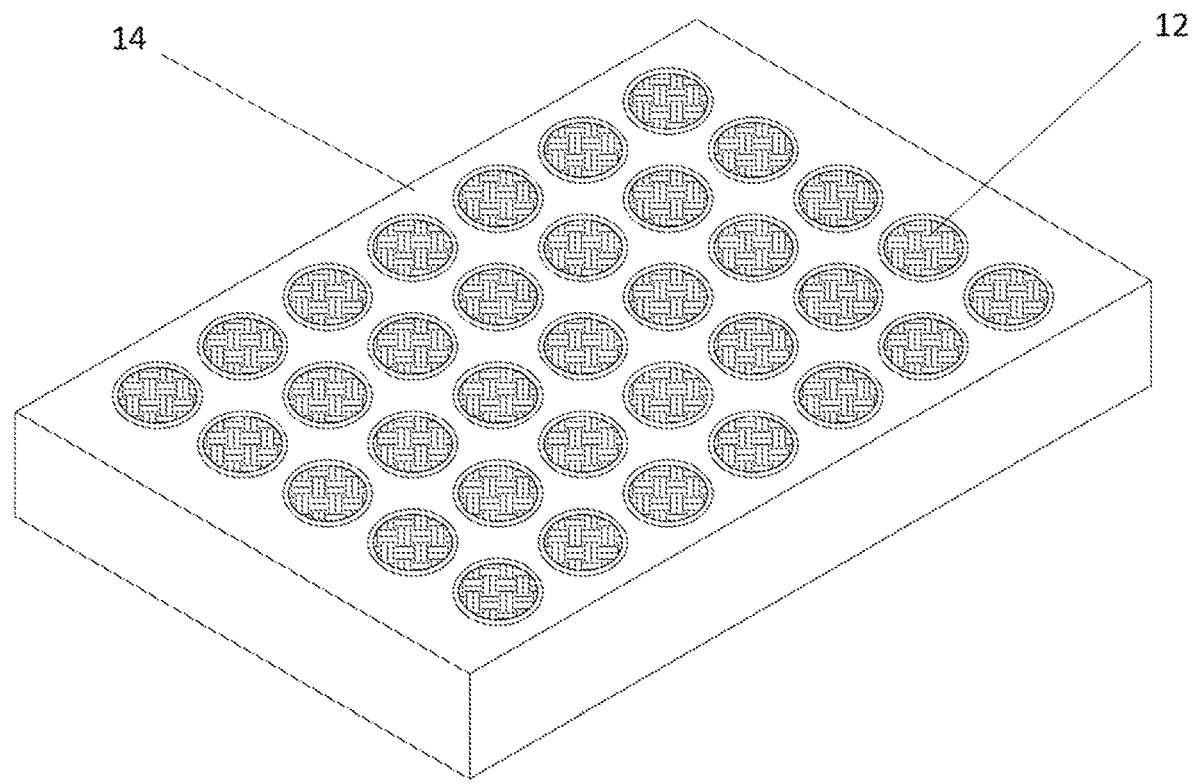
FIG. 7 shows a propagation tray with growth medium pots positioned therein.

FIGS. 3, 5, and 7 show a conveyor unit 30, comprising a conveyor belt 31. The conveyor belt 31 transports growth medium pots 12 from the first apparatus (not shown) to the second apparatus 40, where a sweeping unit 41 (a part of the second apparatus) sweeps or slides the growth medium pots 12 into a guide block 42 (a part of the second apparatus) with five cavities 45, each adapted for receiving and positioning a growth medium pot fed by the sweeping unit 41. The cavity 45 is semi-circular and adapted for positioning and supporting a tubular growth medium pot. The guide block 42 is adapted for guiding a growth medium pot into a cavity in a propagation tray or the like. The guide block is here shown comprising five channels 46, each adapted for receiving a growth medium pot and for guiding said pot towards a cavity in a propagation tray. In order to force the pot through the channel, the second apparatus 40 comprises a plunger or piston unit 44 adapted for being in a first retracted position outside said channels 46 and in a second extended/forwarded position within said channels 46. To time and correctly position the pot at the entrance of said channels 46, the guide block 42 comprises a guide support 43 adapted for being in an extended position in front of and/or above the entrance of said channels 46 and in a retracted position cleared from said entrance. Obviously, a controller unit (not shown) is configured to time the operation of the sweeping unit 41, plunger or piston unit 44 adapted for forcing the pot through the channel 46, and the guide support 43 in order to secure the pot in a cavity of a propagation tray.

FIG. 7 shows a propagation tray 14 filled with growth medium pots 12. The growth medium pot 12 is positioned in the cavity of the propagation tray with a space around it. As previously mentioned, this space must be kept clean, i.e., free from loose growth medium in order to provide a strong plant with healthy growing roots.

REFERENCES

12 Growth medium pots
14 Propagation tray
20 First apparatus
21 Guide support
22 Feeding tube
23 Plunger or piston unit
24 Feed guide
25 Slit or hole
30 Conveyor unit
31 Conveyor belt
40 Second apparatus
41 Sweeping unit
42 Guide block
43 Guide support
44 Plunger or piston unit
45 Cavity
46 Channel
50 Production apparatus

The invention claimed is:

1. A system for packaging growth medium pots into propagation trays comprising:
    an apparatus adapted for producing a length of growth medium cut into growth medium pots of suitable size; and
    a distributor apparatus comprising:
        a first apparatus;
        a conveyor unit; and
        a second apparatus;
        wherein the first apparatus is configured for positioning a single growth medium pot onto the conveyor unit at a time and comprises a guide support adapted for supporting the growth medium pot until the growth medium pot reaches the conveyor belt, wherein the guide support is configured to allow loose growth medium to pass therethrough, thereby preventing the loose growth medium from reaching the conveyor belt;
        wherein the conveyor unit comprises an endless conveyor belt adapted for transporting the growth medium pots towards the second apparatus;
        wherein the growth medium pot is tubular with a side and two terminal ends that are open-ended, and wherein positioning a single growth medium pot onto the conveyor unit at a time is performed such that the growth medium pot is positioned onto the conveyor unit such that growth medium pot rests on one of the growth medium pot's open ends;
        wherein the second apparatus is configured for moving the growth medium pots positioned on the conveyor belt into a propagation tray.

2. The system according to claim 1, wherein said guide support is configured as a grate or as a plate with holes or cut-outs to allow the loose growth medium to pass therethrough, thereby preventing the loose growth medium from reaching the conveyor belt.

3. The system according to claim 1, wherein the first apparatus comprises a feeding tube adapted for connection to a production apparatus adapted for producing a length of growth medium cut into pieces of suitable size, wherein the feeding tube is adapted for receiving a length of growth medium cut into pieces of suitable size from the production apparatus and to deliver a single growth medium pot onto the guide support.

4. The system according to claim 1, wherein the first apparatus comprises a plunger or piston unit and a feed guide, wherein the plunger or piston unit is adapted for feeding a growth medium pot onto the conveyor belt, and wherein said feed guide is adapted for receiving and supporting the growth medium pot as the growth medium pot is fed from the plunger or piston unit, thereby securing a correct position of supporting the growth medium pot on the conveyor belt.

5. The system according to claim 1, wherein the first apparatus comprises a plunger or piston unit and a feed guide, wherein the plunger or piston unit is adapted for feeding a growth medium pot onto the conveyor belt, and wherein said feed guide is adapted for receiving and supporting the growth medium pot as the growth medium pot is fed from the plunger or piston unit, thereby securing a correct position of supporting the growth medium pot on the conveyor belt, and wherein the feed guide is adapted for being in an extended position and a retracted position relative to the plunger or piston unit.

6. The system according claim 1, wherein the second apparatus comprises sweeping unit adapted for removing one or more of the growth medium pots positioned on said conveyor belt and into the second apparatus.

7. The system according to claim 1, wherein the first apparatus comprises a feeding tube adapted for connection to the apparatus adapted for producing a length of growth medium cut into growth medium pots of suitable size, wherein the feeding tube is adapted for receiving a length of growth medium cut into pieces of suitable size from the apparatus and to deliver a single growth medium pot onto the conveyor unit.

8. The system according to claim 7, wherein the feeding tube is configured with an approximately 90-degree turn.

9. A distributor apparatus adapted for positioning growth medium pots into a propagation tray, the distributor apparatus comprising:
- a first apparatus;
- a conveyor unit; and
- a second apparatus;
- wherein the first apparatus is configured for positioning a single growth medium pot onto the conveyor unit at a time;
- wherein the conveyor unit comprises an endless conveyor belt adapted for transporting the growth medium pots towards the second apparatus;
- wherein the growth medium pot is tubular with a side and two terminal ends that are open-ended, and wherein positioning a single growth medium pot onto the conveyor unit at a time is performed such that the growth medium pot is positioned onto the conveyor unit such that growth medium pot rests on one of the growth medium pot's open ends;
- wherein the second apparatus is configured for moving the growth medium pots positioned on the conveyor belt into a propagation tray; and
- wherein the first apparatus comprises a guide support adapted for supporting the growth medium pot until the growth medium pot reaches the conveyor belt, wherein the guide support is configured to allow loose growth medium to pass therethrough, thereby preventing the loose growth medium from reaching the conveyor belt.

10. The distributor apparatus according to claim 9, wherein the guide support is configured as a grate or as a plate with holes or cut-outs to allow the loose growth medium to pass therethrough, thereby preventing the loose growth medium from reaching the conveyor belt.

11. The distributor apparatus according claim 9, wherein the first apparatus comprises a feeding tube adapted for connection to a production apparatus adapted for producing a length of growth medium cut into pieces of suitable size, wherein the feeding tube is adapted for receiving a length of growth medium cut into pieces of suitable size from the production apparatus and to deliver a single growth medium pot onto the guide support.

12. The distributor apparatus according to claim 11, wherein the feeding tube is configured with an approximately 90-degree turn.

13. A distributor apparatus adapted for positioning growth medium pots into a propagation tray, the distributor apparatus comprising:
- a first apparatus;
- a conveyor unit; and
- a second apparatus;
- wherein the first apparatus is configured for positioning a single growth medium pot onto the conveyor unit at a time and comprises a guide support adapted for supporting the growth medium pot until the growth medium pot reaches the conveyor belt, wherein the guide support is configured to allow loose growth medium to pass therethrough, thereby preventing the loose growth medium from reaching the conveyor belt;
- wherein the conveyor unit comprises an endless conveyor belt adapted for transporting the growth medium pots towards the second apparatus;
- wherein the growth medium pot is tubular with a side and two terminal ends that are open-ended, and wherein positioning a single growth medium pot onto the conveyor unit at a time is performed such that the growth medium pot is positioned onto the conveyor unit such that growth medium pot rests on one of the growth medium pot's open ends;
- wherein the second apparatus is configured for moving the growth medium pots positioned on the conveyor belt into a propagation tray; and
- wherein the first apparatus comprises a plunger or piston unit and a feed guide, wherein the plunger or piston unit is adapted for feeding a growth medium pot onto the conveyor belt, and wherein the feed guide is adapted for receiving and supporting the growth medium pot as the growth medium pot is fed from the plunger or piston unit, thereby securing a correct position of supporting the growth medium pot on the conveyor belt.

14. The distributor apparatus according to claim 13, wherein the feed guide is adapted for being in an extended position and a retracted position relative to the plunger or piston unit.

15. The distributor apparatus according to claim 13, wherein the first apparatus comprises a feeding tube adapted for connection to the apparatus adapted for producing a length of growth medium cut into growth medium pots of suitable size, wherein the feeding tube is adapted for receiving a length of growth medium cut into pieces of suitable size from the apparatus and to deliver a single growth medium pot onto the conveyor unit.

16. The distributor apparatus according to claim 15, wherein the feeding tube is configured with an approximately 90-degree turn.

* * * * *